Aug. 30, 1938.  H. F. HANNAY ET AL  2,128,585
SANDING DEVICE
Filed April 15, 1937

INVENTORS
HAMILTON F. HANNAY
HENRY E. BRIGGS
By Roland Ford
ATTORNEY

Patented Aug. 30, 1938

2,128,585

UNITED STATES PATENT OFFICE 2,128,585

SANDING DEVICE

Hamilton F. Hannay and Henry E. Briggs, Westerlo, N. Y.

Application April 15, 1937, Serial No. 137,062

4 Claims. (Cl. 291—25)

Our invention generally relates to a device including a reservoir or bin for sand and the like which is carried on a motor vehicle and provided with suitable, manually operable means for regulating and guiding the discharge of sand from the bin whereby it may be deposited directly in front of the wheels of the vehicle. Obviously, by depositing sand or similar gritty substances in the path of the driving wheels of a vehicle when, for example, a vehicle is passing over slippery pavement, greater traction is afforded between the tires and the pavement both during acceleration and deceleration of the vehicle.

In devices of the foregoing character, it is desirable that simple and efficient means be provided to control the discharge of sand and, in the design of such controls or valves, consideration must be given to the formation of ice, for example, and congelation of mud and other matter both in the valve proper and in the conduit associated therewith.

Our invention particularly relates to a novel means associated with a flexible, resilient conduit for controlling the discharge of sand in devices of the above character and has for an object the provision of a simple and efficient clamping device cooperable with a flexible conduit and so disposed relatively thereto as to prevent collection of substances therein sufficient upon solidification or congelation to blockade the conduit or effect adhesion of the interior walls thereof between the clamping device and the discharge end of the conduit. Obviously, if such conditions obtained, operation of the clamping device to discharge sand would be ineffectual. Another object lies in the provision of a clamping device which is adapted to extend about and retain the end of the flexible conduit in proper discharge position at all times, the actuating elements of which are substantially entirely enclosed and sealed against the admission of foreign matter thereto. For a still further object, our invention contemplates the provision of manually operable means including a flexible-sheathed connector for preserving, for all practical purposes, the sealed character of the clamping device.

With these and other objects in view, our invention includes the novel elements and the combinations and arrangements thereof described below and illustrated in the accompanying drawing in which—

Figure 1:
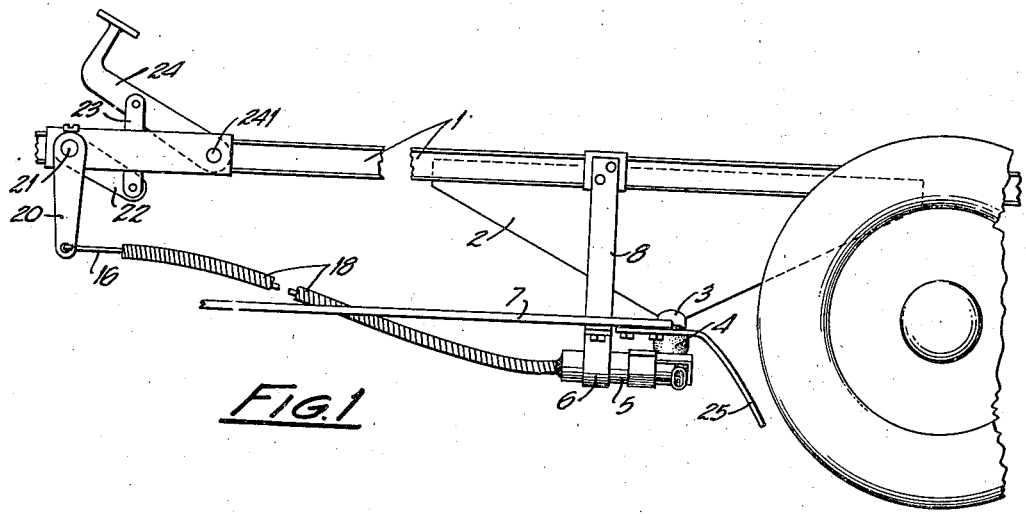
Fig. 1 is a fragmentary elevation view of a portion of a motor vehicle illustrating the application of our invention thereto.
Figure 2:
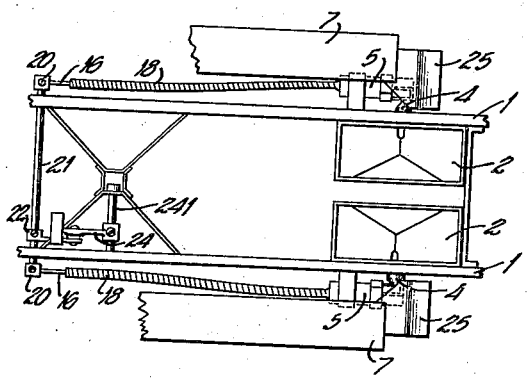
Fig. 2 is a plan view showing the relative arrangement of the parts illustrated in Fig. 1.
Figure 6:
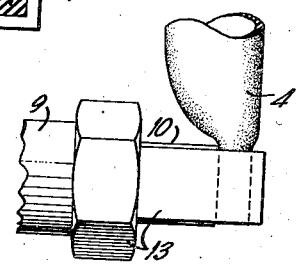
Fig. 6 is a fragmentary plan view of the clamp illustrating the conduit retained therein.

Referring to Figs. 1 and 2, I indicates generally the frame of a motor vehicle upon which are suitably mounted reservoirs or bins 2 for sand and the like. The bins are designed to extend downwardly and converge interiorly to discharge spouts 3 upon which are suitably secured flexible, elastic conduits 4 disposed to discharge respectively in front of the driving wheels of the vehicle. A clamp indicated generally at 5 is disposed adjacent the discharge ends of the conduits 4 and may be suitably secured in position as by means of a bracket 6 which in turn may be secured to the under side of the running board 7 or to a running board bracket 8 to position and control the discharge of sand from the conduit.

Figure 3:
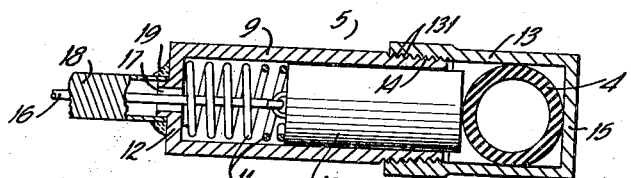
Fig. 3 is a longitudinal sectional view through our clamping device.
Figure 4:
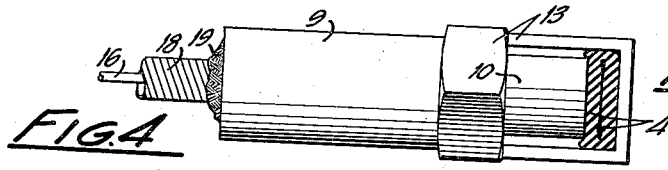
Fig. 4 is an elevation view illustrating the clamp in conduit-compressing position.
Figure 5:
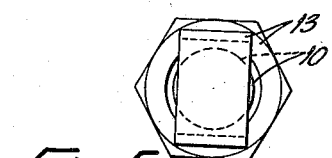
Fig. 5 is an end elevation of the clamp.

The clamp 5, as illustrated in Fig. 3, comprises a tubular element 9 within which is slidably disposed a plunger 10. A helical spring 11 disposed between the plunger 10 and the end wall 12 of the tubular element is adapted normally to urge the plunger 10 outwardly to compress the conduit 4. A yoke element 13, preferably U-shaped in cross section, is interiorly threaded at 131 to engage screw threads 14 of element 9 and secure the two together. The threads preferably constitute pipe threads so that yoke 13 may be securely affixed to the element 9. Obviously, the wall 15 of the yoke member cooperates with the plunger 10 to form a clamping device for the conduit 4 and also a guide and retainer so that the conduit is permanently held in predesigned position. To the plunger 10 is connected one end of a comparatively flexible, connector or wire 16 which extends through an opening 17 in the wall 12 of the tubular element 9 and through a flexible sheathing element 18 one end of which is secured to the element 9 in any suitable way as by soldering, indicated at 19.

The other end of wire 16 is connected to a lever 20 which is mounted on and secured to a shaft 21 extending transversely of the frame of the vehicle. Inasmuch as it is desirable to use discharge conduits adjacent both rear, driving wheels of the vehicle, we have provided shaft 21 extending transversely of the vehicle so that levers 20 may be secured adjacent the ends thereof and substantially in alignment with but above the clamps 5. A lever 22 is also secured to shaft 21 and through the medium of link 23 serves to rotate shaft 21 in response to an actuation of foot pedal 24 which is mounted on shaft 241. Hence, when pedal 24 is depressed, levers 20 adjacent both ends of the shaft 21 are actuated to retract the respective plungers in the clamps 5 and thereby effect a substantially simultaneous decompression of the discharge conduits 4.

It will be noted that the clamp 5 is disposed in close proximity to the discharge end of conduit 4 and this disposition thereof is considered of importance. Ordinarily, if a clamping device is disposed to compress the conduit in a zone remote from the discharge end thereof, the free end of the conduit is open to receive foreign matter such as water, mud and other substances which may congeal therein to cause a blockade or effect adhesion of the interior walls of the conduit. When this occurs and upon releasing the clamp, a discharge will not occur and the conduit must necessarily be replaced or, at least, the blockade removed. With the disposition of the valve adjacent the discharge end of the conduit, as contemplated in our present invention, insufficient free conduit is presented to the atmosphere intermediate the zone of compression thereof and its discharge end to receive sufficient matter to cause a blockade thereof. Furthermore, any resistance to expansion of the conduit offered by the adhesion of particles to the interior walls of the conduit or adhesion of the walls themselves could occur only in such close proximity to the clamping device that it would be overcome by the expansion of the conduit in its zone of compression due to the elastic character thereof.

However, in order further to protect the discharge end of the conduits 4, we have provided generally curvilinear plates 25 which are secured beneath the running board 7 on either side of the vehicle and extend from above the clamps downwardly to a point below and spaced to the side thereof whereby water and the like is prevented from being sprayed thereon from the tires of the vehicle.

From the foregoing, it will be noted that the operating mechanisms of the clamp are substantially entirely protected from the elements and, coupled with the novel disposition of the clamp adjacent the discharge end of the conduit, a very simple but efficient control device or valve is provided which is admirably adapted to function and effect a discharge of sand under all adverse conditions.

While we have described our invention in its preferred embodiment, it is to be understood that the words which we have used are words of description rather than of limitation. Hence, changes within the purview of the appended claims may be made without departing from the true scope and spirit of our invention in its broader aspects.

What we claim is:

1. In a device of the character described for use with motor vehicles having a storage bin for sand and the like, the combination wiht a compressible, elastic conduit for discharging sand from said bin of relatively movable members disposed in cooperative relation on opposite sides of said conduit and at the discharge end thereof for effecting a compression of the ends of said conduit to close said conduit whereby foreign matter cannot enter said conduit when compressed by said members, resilient means adapted normally to compress said members whereby a closure of said conduit is effected and means for separating said members to permit expansion of said conduit.

2. In a device of the character described for use with motor vehicles having a storage bin for sand and the like, the combination with a compressible, elastic conduit for discharging sand from said bin of means including a yoke member extending about said conduit at its discharge end and a movable clamping element, a spring adapted normally to urge said clamping element toward said yoke in conduit-compressing position to close said conduit and means for retracting said element; said yoke and element forming a support and clamp arranged to compress said conduit at the extremity thereof whereby to normally close substantially the entire length of conduit to the atmosphere and prevent admission of foreign matter thereto.

3. In a device of the character described for use with motor vehicles having a storage bin for sand and the like, the combination with a compressible, elastic conduit for discharging sand from said bin of a clamp therefor comprising a tubular element having a plunger slidably fitted therein and a substantially U-shaped yoke extending beyond the bore of said element and surrounding said conduit, a spring adapted normally to urge said plunger to conduit-compressing position to close said conduit and manually operable means for retracting said plunger; said clamp being disposed immediately at the discharge end of said conduit whereby to control and guide the discharge of sand therefrom and upon normal compression of said conduit to prevent the admission of foreign matter thereto.

4. In a device of the character described for use with motor vehicles having a storage bin for sand and the like, the combination with a compressible, elastic conduit for discharging sand from said bin of a clamp therefor comprising a tubular element having a plunger slidably fitted therein and a portion extending about said conduit and adapted cooperatively with said plunger to compress said conduit therebetween, a spring for normally urging said plunger outwardly in conduit-compressing position to close said conduit and manually operable means including a lever and flexible-sheathed connecting means secured to said lever and plunger for retracting the same when said lever is actuated; said clamp being disposed to engage and compress the walls of said conduit forming the discharge mouth thereof whereby to normally prevent the admission of foreign matter to said conduit when compressed by said clamp.

HAMILTON F. HANNAY.
HENRY E. BRIGGS.